(12) United States Patent
Beavis et al.

(10) Patent No.: US 7,100,979 B2
(45) Date of Patent: Sep. 5, 2006

(54) FOAM PADDED SEAL WITH STORAGE SPACE

(75) Inventors: Andy Beavis, Thief River Falls, MN (US); Ron Bergman, McIntosh, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/283,383

(22) Filed: Oct. 29, 2002

(65) Prior Publication Data

US 2004/0080192 A1 Apr. 29, 2004

(51) Int. Cl.
*A47C 7/62* (2006.01)

(52) U.S. Cl. .................................. 297/188.08

(58) Field of Classification Search ........... 297/188.08, 297/188.01, 452.48, 452.58, 440.1, DIG. 1, 297/188.11, DIG. 2, 195.1; 296/65.03; 248/503.1, 248/408, 275; 224/408, 275
See application file for complete search history.

(56) References Cited

U.S. PATENT DOCUMENTS

| | | | | |
|---|---|---|---|---|
| 2,093,912 A | * | 9/1937 | Hayes et al. ........... | 297/188.11 |
| 4,157,797 A | * | 6/1979 | Fox ........................ | 244/122 R |
| 4,544,126 A | * | 10/1985 | Melchert ................... | 249/83 |
| 5,542,747 A | * | 8/1996 | Burchi .................. | 297/452.55 |
| 5,720,513 A | * | 2/1998 | Raukauskas ............ | 297/188.1 |
| 5,947,562 A | * | 9/1999 | Christofferson et al. .................... | 297/440.22 |
| 6,027,164 A | * | 2/2000 | Jakubiec et al. ........ | 297/188.01 |
| 6,086,149 A | * | 7/2000 | Atherley .................. | 297/195.1 |
| 6,390,547 B1 | * | 5/2002 | Spykerman .............. | 297/188.1 |
| 6,419,313 B1 | * | 7/2002 | Newman ................ | 297/188.1 |

\* cited by examiner

*Primary Examiner*—Milton Nelson, Jr.
(74) *Attorney, Agent, or Firm*—Black Lowe & Graham, PLLC

(57) ABSTRACT

A vehicle seat with a rigid seat base, and at least one foam portion disposed on the seat base. The seat defines at least one cavity therein. The cavity is accessible from the bottom surface of the seat, and accepts cargo, such as a shovel, therein. The cavity may be shaped to conform to a specific, predetermined cargo. The seat may be molded by disposing the seat base in a mold, and introducing settable foam into the mold so as to fill the portion of the mold not occupied by the seat base. The foam portion so produced conforms to the shape of the mold, such that a cavity may be formed by providing the mold with an internal projection. The seat may be removably attached to a vehicle using a quick-release mechanism, such as a pin and spring catch.

25 Claims, 10 Drawing Sheets

FOAM PADDED SEAL WITH STORAGE SPACE

BACKGROUND OF THE INVENTION

1. Field of the Invention

The invention relates to a vehicle seat with a layer of foam, having a cavity for storage, to a method of producing a vehicle seat with a layer of foam, and to a method for attaching a vehicle seat to a vehicle.

2. Description of Related Art

Seats for accommodating people on a vehicle such as a snowmobile are well-known. Vehicle seating systems commonly include a generally rigid base, with one or more foam portions or similar material to provide padding.

It is also known to make provision for carrying cargo on vehicles.

Several arrangements for carrying cargo on a vehicle are known. However, conventional arrangements have disadvantages.

Cargo can be attached to the exterior of a vehicle, for example with straps, pins, or similar fixtures. However, cargo attached to a vehicle's exterior is exposed to the outside environment, and any hazards posed thereby, i.e. dirt, mud, snow, impacts from debris or obstacles, etc. In addition, cargo attached to a vehicle's exterior is prone to falling off, sometimes without the vehicle operator even being aware of the loss.

In some instances, vehicles may be made with external recesses suitable for attaching cargo therein. However, although this provides limited protection, the cargo nevertheless is exposed to the outside environment.

Cargo also can be stored in enclosed compartments disposed on or inside of the vehicle. However, cargo compartments within the vehicle conventionally take up space that otherwise would be devoted to some other purpose, i.e. space for the rider, the engine, etc. Either the available internal volume of the vehicle is reduced, or the vehicle must be made larger to compensate for the additional volume required. Enclosed cargo compartments affixed to the outside of a vehicle increase the exterior size of the vehicle, which may make it more difficult to maneuver the vehicle when space is limited, and near obstacles. This is of particular concern for vehicles, such as snowmobiles, that travel off-road, where obstacles are especially common. In addition, whatever their location, conventional enclosed compartments increase the overall weight of the vehicle.

Conventionally, seats with a foam portion are produced as several separate components, which are then fixed together. For example, a seat base is produced, a foam portion is produced, and the two are then fitted together and connected with adhesive, screws, etc.

However, this is disadvantageous, particularly but not only for forming a seat having a cavity therein for cargo. When joining one or more foam components to a seat base, it is necessary to manufacture each part separately. Each foam component must be cast, cut, or otherwise pre-formed to the proper shape, fitted to the seat base, and then attached thereto. This requires a significant amount of time and effort. These disadvantages are especially pronounced when the foam portion has a complex shape, i.e. one with a cavity therein for cargo.

In addition, conventional vehicle seats are mounted on vehicles in a permanent or semi-permanent fashion. For example, the seats may be connected with a large number of bolts, screws, etc., which require considerable time and effort to remove, if they are removable at all.

Access to areas directly under the seat therefore can be inconvenient with conventional designs. If it becomes necessary to access some structure under the seat, a significant amount of disassembly may be required. This is a disadvantage, especially on small vehicles wherein the seat covers a relatively large portion of the vehicle's surface. It is in particular a disadvantage for vehicles having a cavity for cargo storage therein, since for some embodiments the cavity may be located on an undersurface of the seat. In such an instance, a long and/or complicated seat removal process may make it difficult to access the cargo when it is needed.

In addition, for certain embodiments it may be disadvantageous to leave a seat permanently attached to a vehicle. For example, certain types of foam conventionally used in vehicle seats are prone to absorbing moisture. Seats often are more readily dried if they are removed from the vehicle. Likewise, it may be desirable in certain embodiments to remove a seat for storage of the vehicle, or as a security measure to dissuade theft. However, if the seat is permanently or semi-permanently attached to the vehicle, removal for such purposes may be difficult.

SUMMARY OF THE INVENTION

It is the purpose of the claimed invention to overcome these difficulties, thereby providing an improved vehicle seat with provision for cargo storage.

An exemplary embodiment of a vehicle seat in accordance with the principles of the claimed invention includes a generally rigid seat base, with a foam portion disposed on the base. The seat defines at least one cavity therein, accessible from the bottom surface of the seat. The cavity is adapted to accept cargo therein.

Such an arrangement is advantageous, in that it does not require the separate storage compartments that add volume and weight. Furthermore, the cargo stored in the cavity is not decreasing the space that would normally be available for other purposes. Instead, a portion of the foam the might otherwise be present in a seat is replaced by space for cargo, with little or no noticeable change in comfort to the vehicle operator.

The seat may also define a recess that is accessible from some surface of the seat other than the bottom surface. For example, the recess may be accessible from the rear of the seat. The recess and the cavity may be in communication, such that cargo may be placed in or removed from the cavity by way of the recess.

The cavity may be shaped to accommodate a particular cargo, and/or to specifically conform to the shape of that cargo. For example, for a snowmobile seat, it may be advantageous in certain embodiments for the cavity to be shaped to accept a shovel for shoveling snow therein.

The seat may include more than one foam portion. In such a case, the several foam portions may be made from different types, compositions, and/or densities of foam. For example, the seat may include a first foam portion of rigid foam disposed on the seat base, with a second foam portion of flexible foam disposed on the first foam portion.

The seat may include seat retention means for releasably retaining the seat on a vehicle. The seat retention means may be quick release retention means, facilitating quick installation and removal of the seat. The seat retention means also may be engageable and/or releaseable without the use of tools.

The seat may include cargo retention means for holding cargo in place within the cavity.

The foam portion may be co-molded to the seat base. Also, the seat base may include keys to improve the grip between the foam portion and the seat base.

It is also the purpose of the claimed invention to provide an improved method of manufacturing vehicle seats, including seats with a cavity therein for cargo storage.

An exemplary method of molding a vehicle seat in accordance with the principles of the claimed invention comprises the steps of placing a seat base in a mold. The mold typically will be larger than the seat base, so as to allow room for foam to be added.

A settable foam is added to the mold. The foam fills the empty space in the mold, conforming to both the inner contours of the mold and the shape of the seat base. In this fashion, a foam portion is formed on the seat base. This process is sometimes referred to as "co-molding", since the seat base is in the same mold as the foam portion that is being added.

The resulting foam portion can be produced in any desired shape, depending on the shape of the interior of the mold. For example, it is possible to form cavities and recesses within the foam by including projections within the mold. Even for very complex shapes, it is not necessary to cast or otherwise fabricate foam pieces separately and then attach them.

In addition, in certain embodiments, the foam bonds to the seat base as it sets, so that adhesive, fixtures, etc. are not required to hold the foam to the seat base. The seat base may be provided with keys around which the foam may conform, so as to provide greater grip between the foam portion and the seat base.

In certain embodiments, it may be advantageous to provide the mold with projections, so that cavities and/or recesses are defined in the foam when it is added to the mold.

It is furthermore the purpose of the claimed invention to provide an improved method of connecting vehicle seats to vehicles, including seats with a cavity therein for cargo storage.

An exemplary method of connecting a vehicle seat to a vehicle in accordance with the principles of the claimed invention comprises the steps providing the seat with a quick-release means, such as one or more pins and spring clips.

The seat may include a cavity in a foam portion thereof for storing cargo. The method is especially advantageous when the cavity is on the bottom surface of the seat. In this way, the cargo is covered by the seat when the seat is in place, but is readily accessible by partially or entirely removing the seat.

BRIEF DESCRIPTION OF THE DRAWINGS

Like reference numbers generally indicate corresponding elements in the figures.

DETAILED DESCRIPTION OF THE PREFERRED EMBODIMENT

Figure 1:
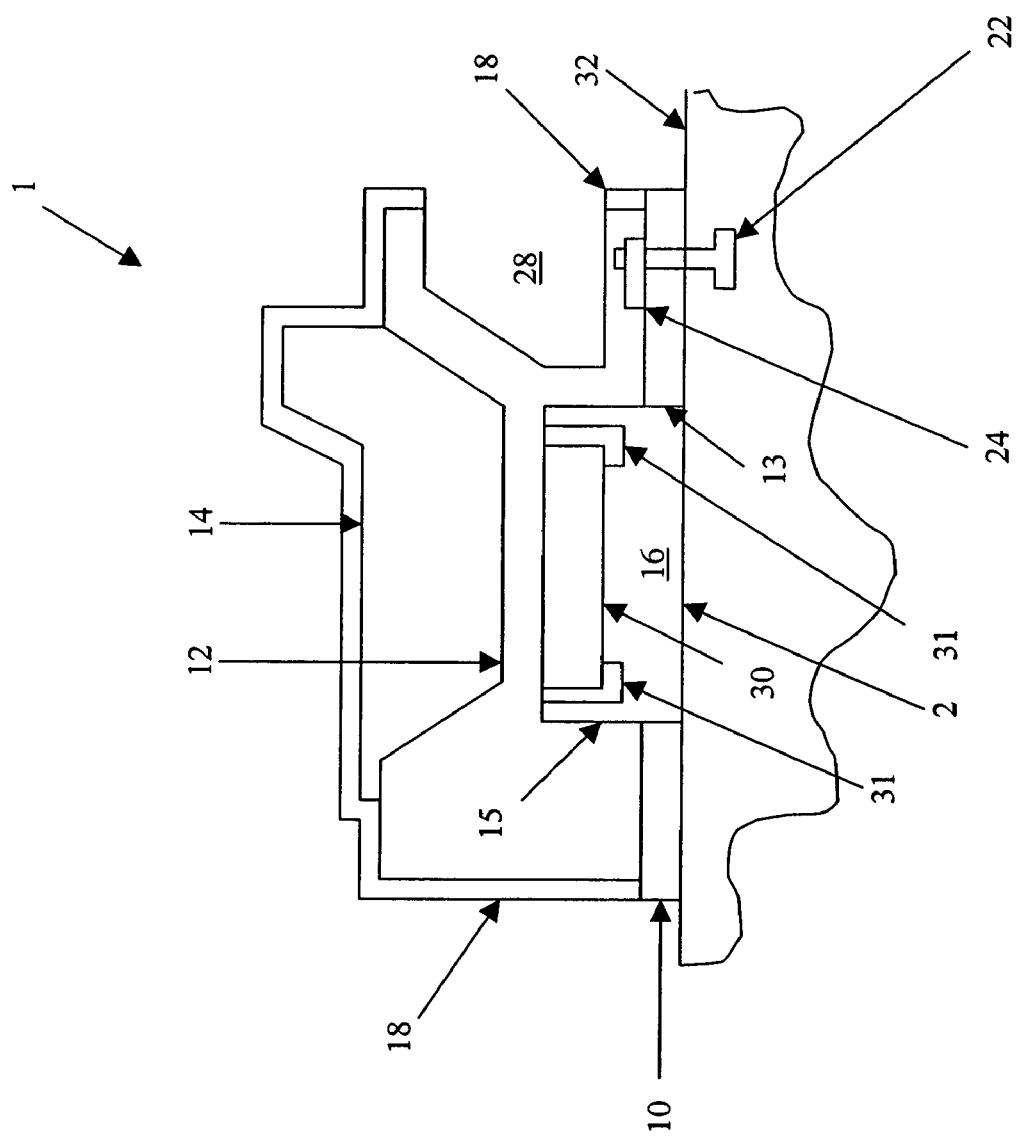
FIG. 1 is a cross-sectional view of an exemplary embodiment of a seat in accordance with the principles of the claimed invention.

Referring to FIG. 1, a seat 1 in accordance with the principles of the claimed invention includes a seat base 10. The seat base is generally rigid, but may be slightly flexible. It may be made of any suitably sturdy material, including but not limited to plastic and metal.

The seat base 10 may be solid and continuous, or it may have openings or spaces therein. For example, in the exemplary embodiment illustrated in FIG. 2, the seat base 10 has openings through which a foam portion 12 can be seen. The seat base 10 may be made of a single piece of material, or it may be assembled from two or more separate pieces.

At least one foam portion 12, 14 is disposed on the seat base 10. FIG. 1 shows a first foam portion 12 with a second foam portion 14 thereon. However, this arrangement is exemplary only. For some embodiments, it may be equally suitable to use a single foam portion, or to use three or more foam portions.

Likewise, although FIG. 1 shows the first foam portion 12 disposed on the seat base 10 and the second foam portion 14 disposed on the first foam portion 12, this arrangement is also exemplary only. Where multiple foam portions are present, each foam portion may cover only a portion of the seat base and/or the layer foam portion underneath.

Furthermore, although as illustrated in FIG. 1 the first foam portion 12 covers substantially the entire seat base 10, while the second foam portion 14 covers only part of the first foam portion 12, this is exemplary only. The first foam portion 12 may cover some or all of the seat base 10; the second foam portion 14 may cover some or all of the first foam portion 12, and/or any exposed areas of the seat base 10.

The seat 1 defines at least one cavity 16 therein. The cavity 16 is defined in a location that is accessible from the bottom surface 2 of the seat 1. For example, as may be seen from FIGS. 1 and 2, the cavity 16 extends through an opening or recess 13 in the seat base 10 and an opening or recess 15 in the first foam portion 12.

However, this arrangement is exemplary only. In other embodiments, the cavity 16 may be defined only in the seat base 10, or may extend into the second foam portion 14.

In addition, the seat 1 may define one or more recesses 28 therein, that is accessible from other than the bottom surface 2 of the seat 1. An exemplary recess 28 is shown in FIG. 1, and is accessible from the rear of the seat 1. The recess 28 may be adapted to receive cargo, or it may remain empty, or it may serve other purposes.

Figure 3:
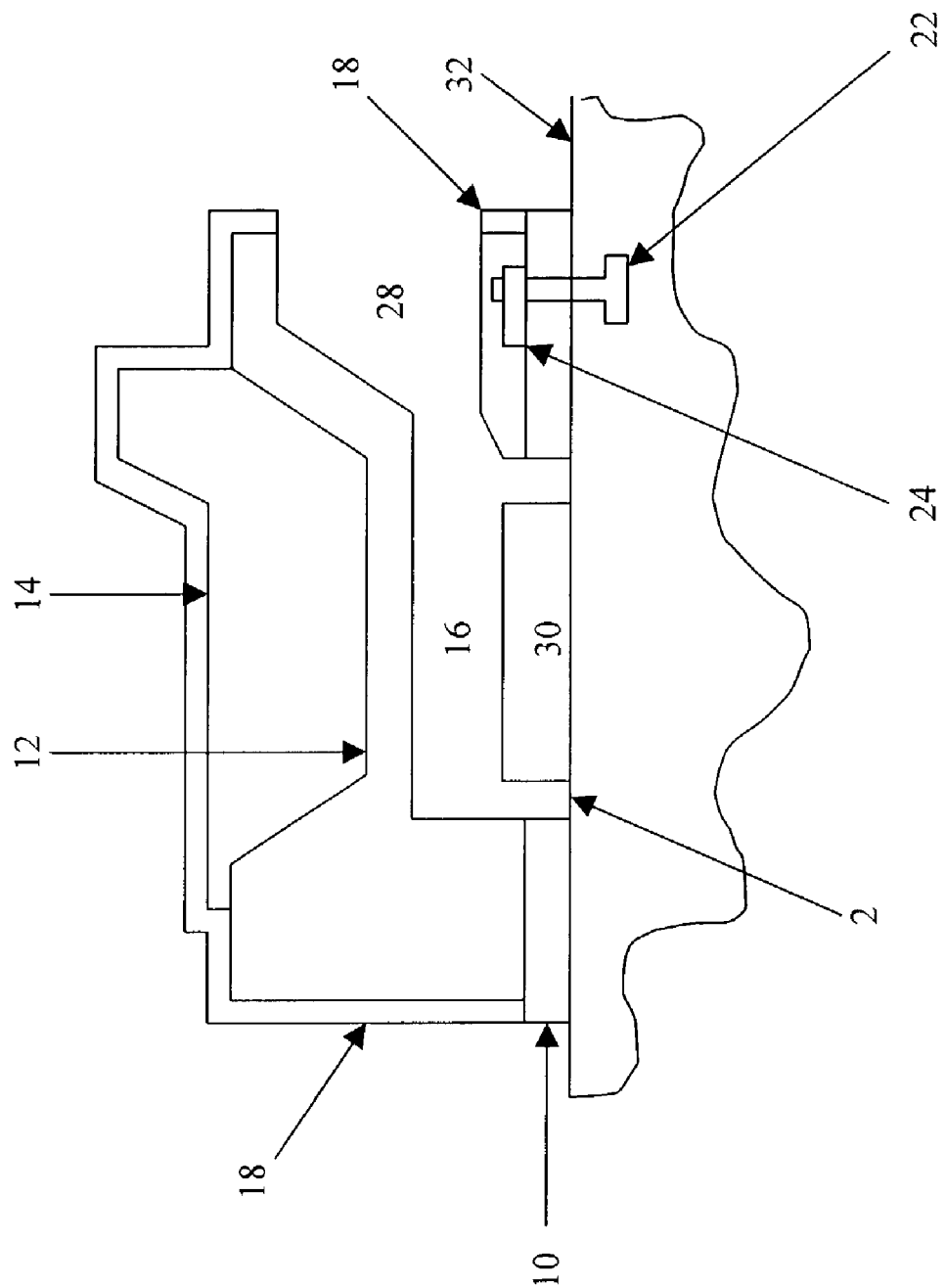
FIG. 3 is a cross-sectional view of another exemplary embodiment of a seat in accordance with the principles of the claimed invention, with a cavity and a recess that are in communication.

In certain embodiments, the recess 28 may be in communication with the cavity 16. Thus, cargo 30 may be placed in and retrieved from the cavity 16 via the recess 28. Such an embodiment is illustrated in FIG. 3. However, this arrangement is exemplary only, and embodiments wherein the recess 28 and the cavity 16 are separate and not in communication may be equally suitable.

It is noted that, in embodiments wherein the recess 28 and the cavity 16 are not in communication, cargo 30 may be placed in and removed from the cavity 16 by moving the seat 1 from its in-use position on the vehicle 32, or by removing the seat 1 entirely from the vehicle.

A variety of foam types may be suitable for use as the foam portions 12, 14. Suitable foam types include, but are not limited to, open cell foam, closed cell foam, rigid foam, and flexible foam. A wide range of foam compositions and densities likewise may be suitable for use as the foam portions 12, 14. In addition, in certain embodiments, different foam portions 12, 14, may be made of different types of foam, different compositions, and/or different densities.

Although as shown, only one cavity 16 is defined in the seat 1, this is exemplary only. For some embodiments, two or more cavities 16 may be defined therein. Likewise, although only one recess 28 is illustrated, in other embodiments two or more recesses 28 may be defined in a particular seat 1.

As most easily seen in FIGS. 1 and 3, the cavity 16 is adapted to accept cargo 30 therein. Although the cargo 30 is illustrated herein in a simple schematic fashion, actual cargo carried may vary considerably.

In certain embodiments, the cavity 16 may be shaped so as to conform with a particular predetermined type of cargo 30, thereby providing a close fit with little or no unused space when that type of cargo 30 is carried. In such a case, the cavity 16 typically would be formed with the specific shape of the predetermined cargo 30. For example, the cavity 16 might be made in the shape of a shovel, a thermos, or some other implement, so as to conform closely to the shape of that shovel, thermos, or other implement. However, this is exemplary only.

The cargo 30 need not be limited to only a single object, or to a fully assembled object or objects. For example, the cavity 16 might be so shaped as to accept a shovel separated into two pieces, such as a shovel blade and a handle, as cargo 30. The cavity 16 likewise may be shaped so as to conform closely to both pieces of the shovel or other cargo 30, so as to provide a close fit for both pieces when they are stored within the cavity 16.

In some embodiments, the seat 1 also may include cargo retaining means 31 for retaining the cargo 30 within the cavity 16. For example, as illustrated in FIGS. 1 and 3, hooks may be used to support the cargo 30 and hold it in place. However, this is exemplary only, and other cargo retaining means 31, including but not limited to straps, webs, and catches may be equally suitable. Furthermore, for some embodiments it may be equally suitable to omit the cargo retaining means.

In addition, in certain embodiments wherein the cavity 16 is shaped so as to conform to a specific predetermined cargo 30, the cavity 16 itself may serve as cargo retaining means 31 by virtue of the close fit between the surface of the cavity 16 and the cargo 30. For example, in a cavity 16 fitted especially for a shovel, most or all of the shovel would be in contact or nearly in contact with the wall of the cavity 16. Thus, movement of the shovel within the cavity 16 would be restricted or prevented altogether, since there is little or no room for the shovel to move around.

Figure 10:
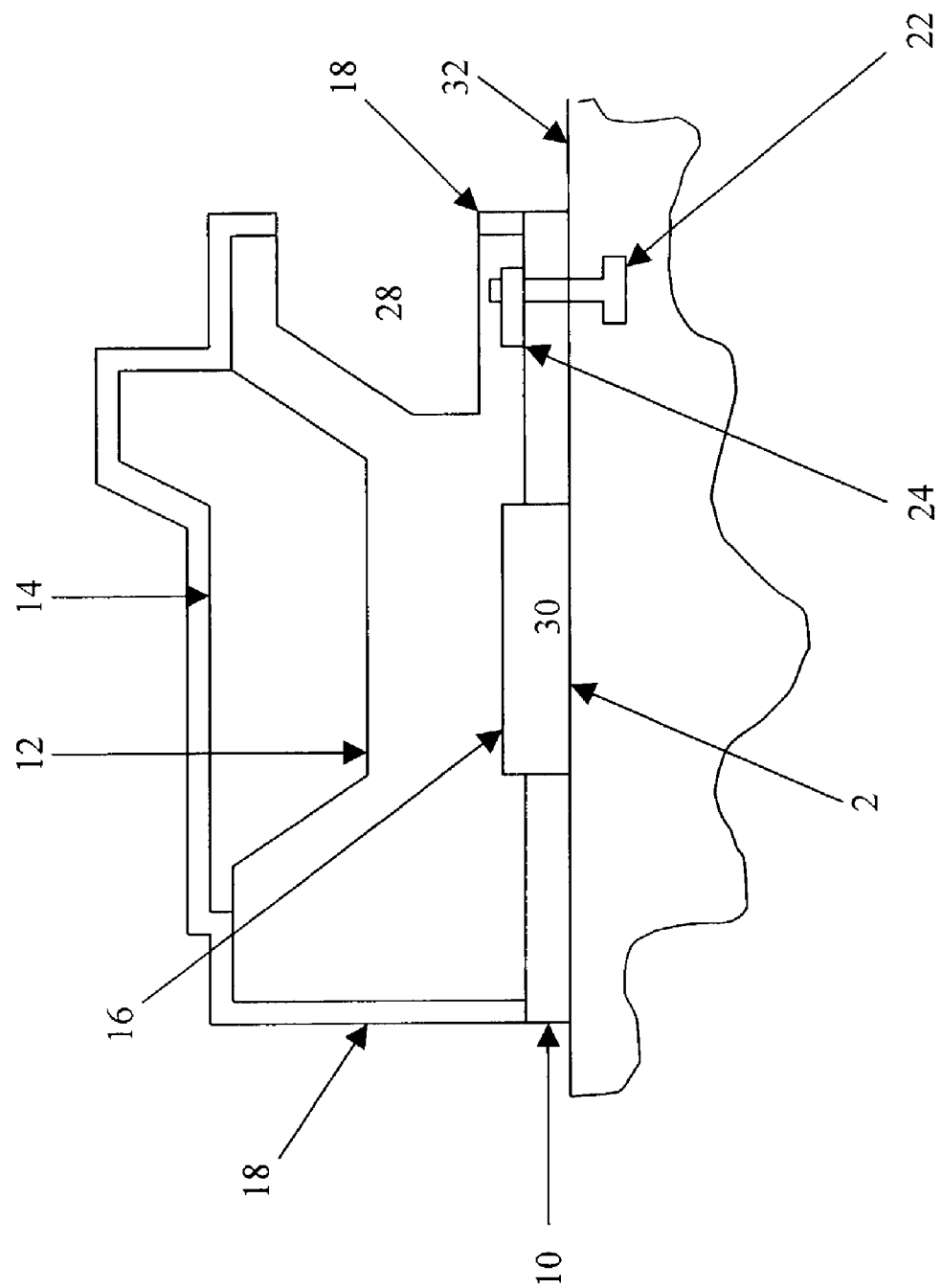
FIG. 10 is a cross-sectional view of another exemplary embodiment of a seat in accordance with the principles of the claimed invention, with a cavity shaped to conform closely to a specific cargo.

Such an arrangement is illustrated in FIG. 10.

In particular, it is noted that some types of foams have at least a small amount of "give", even some foams normally considered to be rigid foams. Thus, if the cavity 16 extends into the first and/or second foam portions 12 and 14, the cavity 16 may be shaped so as to wrap around the predetermined cargo 30. The give of the foam may then provide the walls of the cavity 16 with enough flexibility that the cavity 16 could actually be made slightly smaller then the cargo 30, and/or of slightly different shape, and would then deform to accept the cargo 30 within and secure it in place.

However, theses arrangements are exemplary only.

The seat 1 may include a cover 18. A variety of cover materials may be suitable, including but not limited to flexible plastic, cloth, and leather. Although as illustrated, the cover 18 is disposed over essentially the entirety of the first and second foam portions 12 and 14, this is exemplary only. The cover 18, if present, may cover some or all of the foam portions 12, 14, and/or the seat base 10.

In some embodiments, the seat may include seat retention means 22, 24 for retaining the seat 1 against the vehicle 32. A wide variety of seat retention means may be suitable. However, in certain embodiments, it may be advantageous for the seat retention means 22, 24 to be quick release retention means, enabling the seat 1 to be readily moved from its in-use location on the vehicle 32, and/or entirely removed from the vehicle 32.

In addition, it may be advantageous in certain embodiments for the seat retention means seat retention means 22, 24 to be such that the seat 1 may be affixed to the vehicle 32, moved on the vehicle 32, and/or removed from the vehicle 32 without the use of tools.

Figure 2:
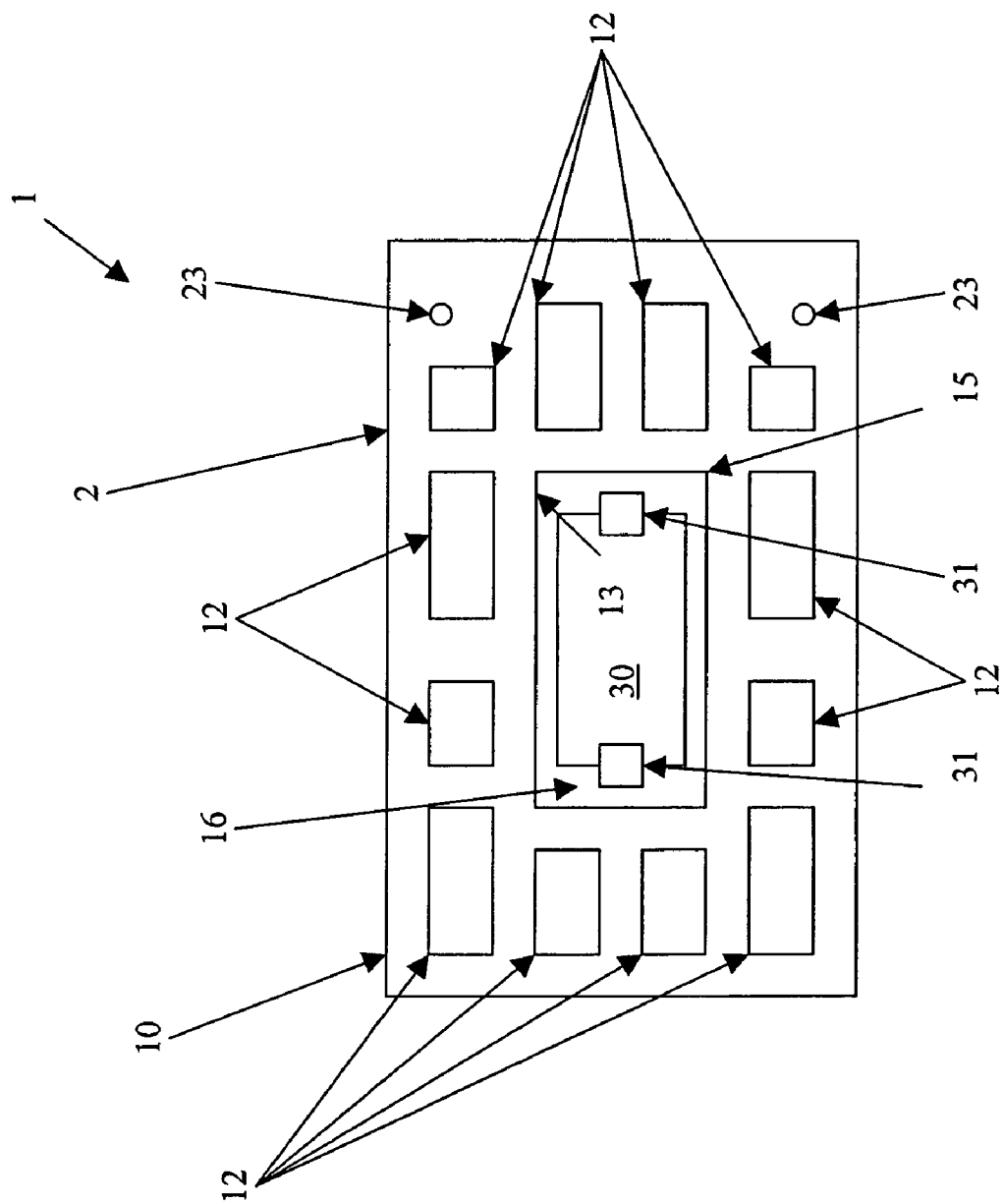
FIG. 2 is a bottom view of the seat of FIG. 1.

As illustrated in FIGS. 1–3, the seat retention means 22, 24 provide for quick-release, and include a pin 22 mounted in the vehicle 32 and passing through an aperture 23 in the seat base 10, with a spring clip 24 preventing the seat 1 from being removed from the pin 22. With such an arrangement, the seat 1 may be removed from the vehicle 32 by freeing the spring clip 24 from the pin 22 and pulling the seat 1 upwards. Such an arrangement thus is both quick-release, and may be engaged or disengaged without tools.

However, this arrangement is exemplary only, and other arrangements may be equally suitable. In particular, other seat retention means 22, 24 may be suitable, including but not limited to other quick-release seat retention means, and other seat retention means that may be engaged and disengaged without tools, such as snaps. The ability to completely remove the seat 1 from the vehicle 32, as in the embodiments illustrated in FIGS. 1 and 3, also is exemplary only. Embodiments wherein the seat 1 may be moved from its in-use location without being removed from the vehicle 32 may be equally suitable. For example, the seat 1 might be hinged so as to swing away from the vehicle 32, mounted on tracks so as to slide, etc.

Figure 4:
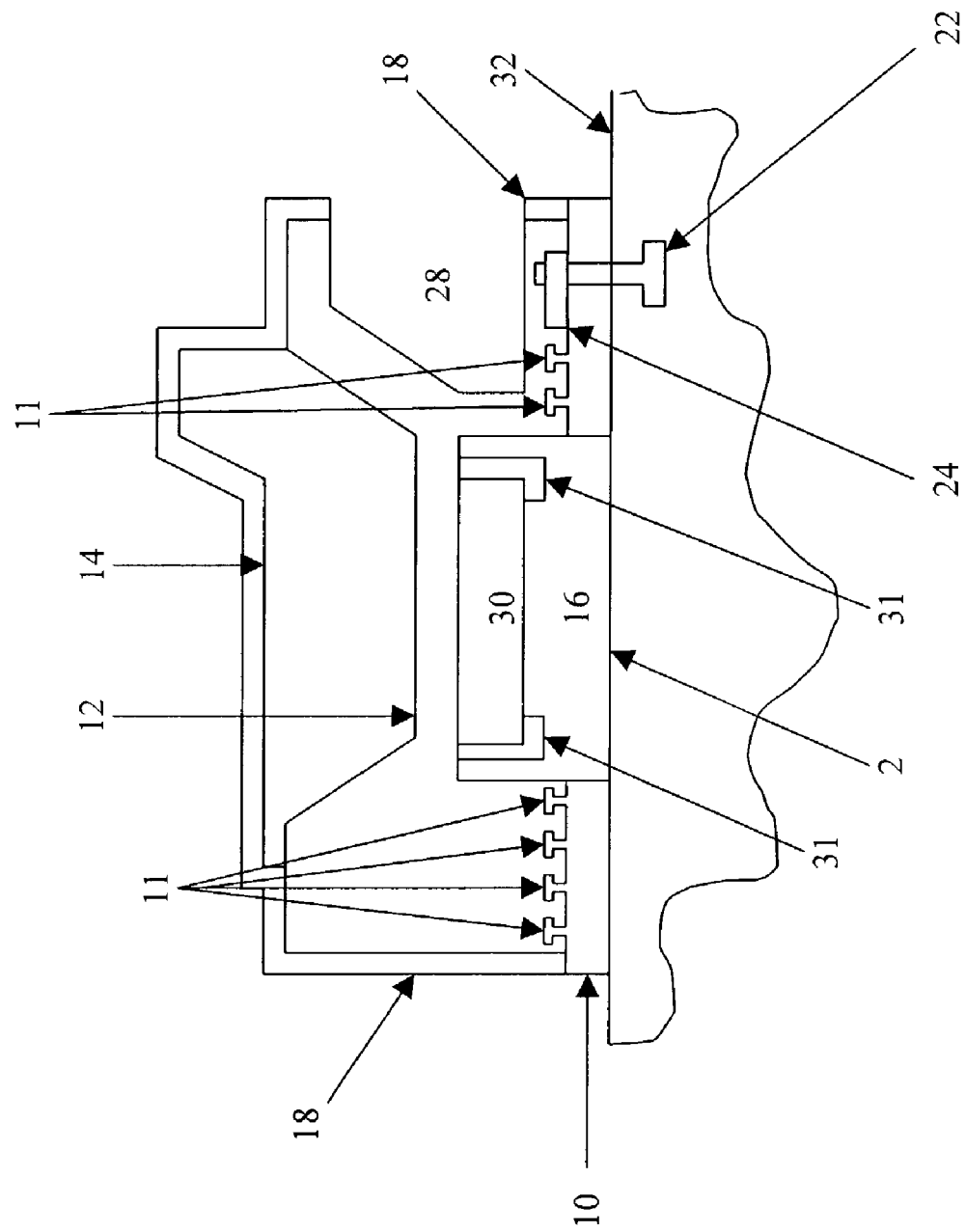
FIG. 4 is a cross-sectional view of another exemplary embodiment of a seat in accordance with the principles of the claimed invention, wherein the seat base is keyed.

As illustrated in FIG. 4, the seat base 10 may include keys 11, that is, projections and/or recesses that facilitate a grip between the seat base 10 and the foam portion 12, 14.

As illustrated, the keys 11 are T-shaped projections extending upwards from the seat base 10 into the first foam portion 12. Because first foam portion 12 and the keys 11 interlock, the first foam portion 12 is inclined to remain in place merely by virtue of the relative shapes of the seat base 10 and the first foam portion 12, even without such means as adhesive, screws, etc.

However, the illustrated form of the keys 11 is exemplary only. A wide variety of other key shapes may be equally suitable, including but not limited to open and/or closed loops and straight projections and/or recesses. Furthermore, a roughened surface of the seat base 10, i.e. one produced by machining processes such as grinding, sanding or the like, or by molding or other forming processes that naturally create a rough surface, may also be equally suitable for use as keys 11.

The keys 11 may be integral with the seat base 10, i.e. made of the same material and of a single piece therewith, or they may be separate components added to the seat base 10.

The use of keys 11 between the seat base 10 and the first foam portion 12 is exemplary only, and embodiments without keys 11 may be equally suitable. In addition, although keys 11 are illustrated only between the seat base 10 and the first foam portion 12, embodiments with keys between the seat base 10 and the second foam portion 14, and/or between the first and second foam portions 12 and 14, may be equally suitable.

Figure 5:
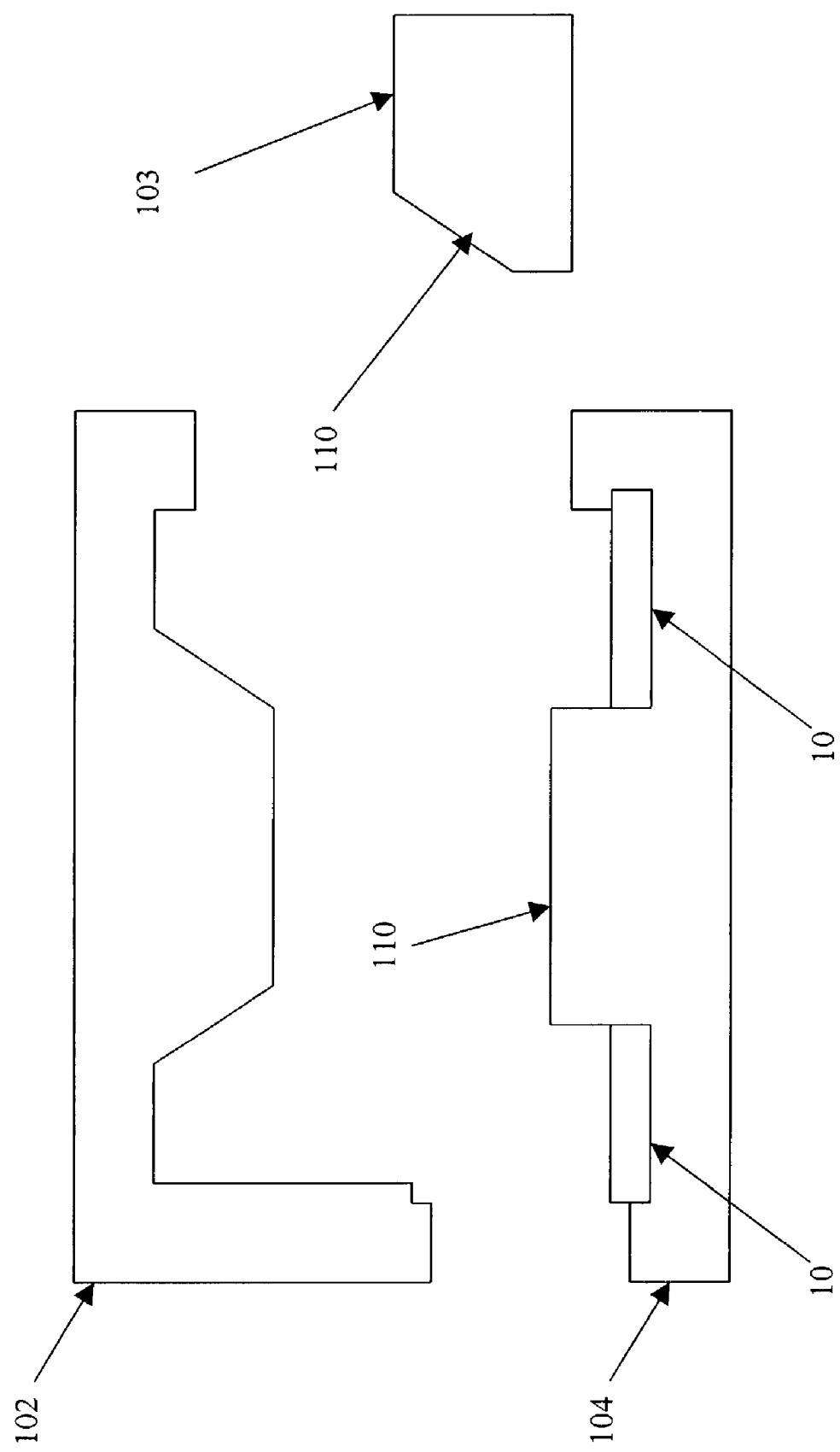
FIG. 5 is a schematic illustration of a step in an exemplary method of forming a seat in accordance with the principles of the claimed invention, showing a seat base in a mold.

As shown in FIG. 5, an exemplary method of molding a vehicle seat 1 in accordance with the principles of the claimed invention includes the step of disposing a seat base 10 in a mold 102, 104. The mold parts 102, 103 and 104 are shown separated for clarity. As illustrated, the mold 102, 103, 104 is a three-part mold, with an upper part 102, a center part 103, and a lower part 104. However, this is exemplary only, and other types of molds may be equally suitable.

As may be understood from FIG. 5, the seat base 10 occupies a portion of the mold 102, 103, 104, but a portion of the mold 102, 103, 104 remains open.

Figure 6:
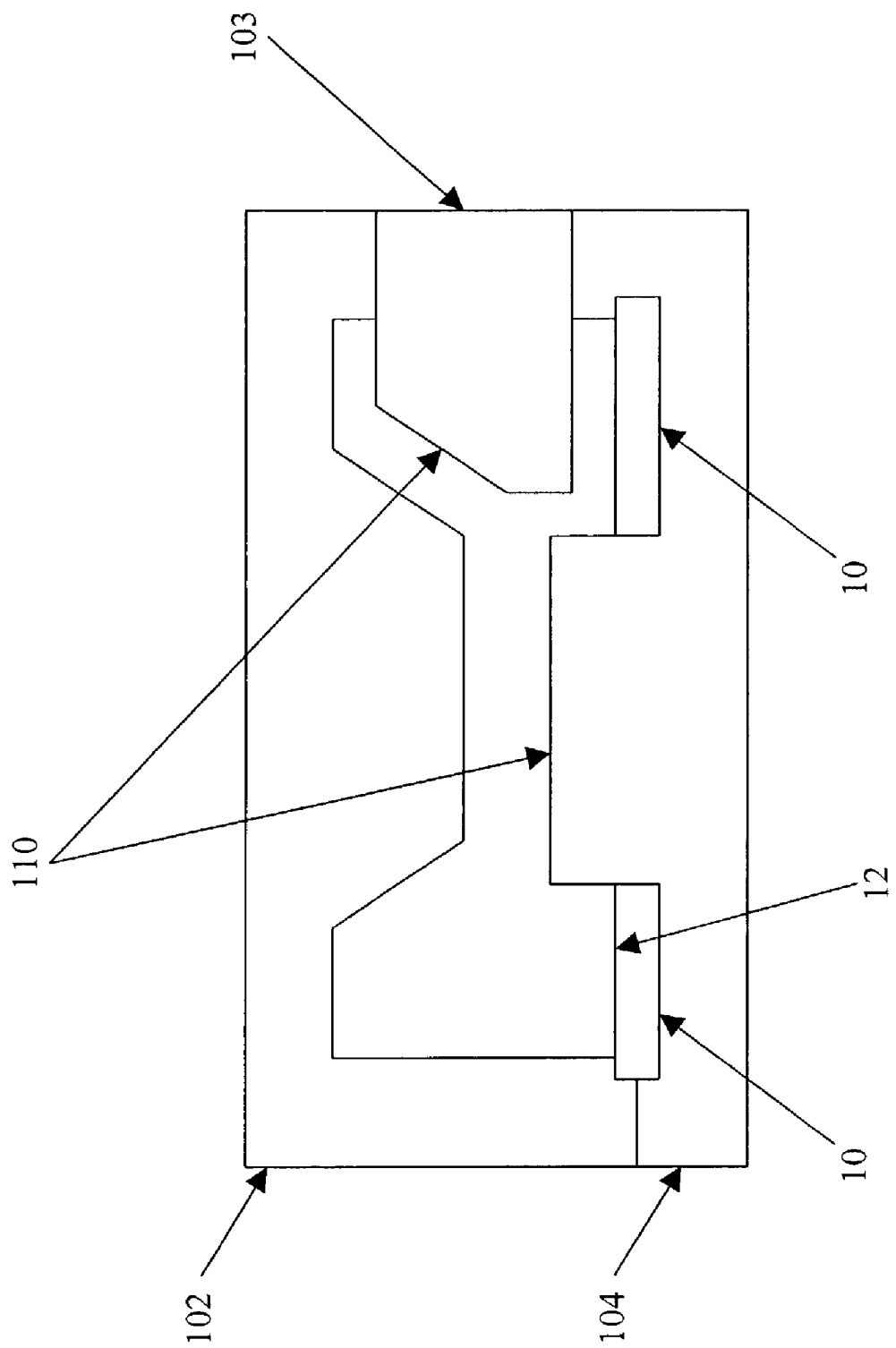
FIG. 6 is a schematic illustration of a step in an exemplary method of forming a seat in accordance with the principles of the claimed invention, showing a foam material introduced into the mold of FIG. 5.

A settable foam is introduced into the mold 102, 103, 104, so as to substantially fill the portion of the mold 102, 103, 104 that is not occupied by the seat base 10. The resulting combination is shown in FIG. 6. When the settable foam sets, it bonds to the seat base 10, forming a first foam portion 12 that conforms to the shape of the inner surface of the mold 102, 103, 104. The seat 1, comprising the base 10 and the first foam portion 12, is then removed from the mold 102, 103, 104.

Figure 7:
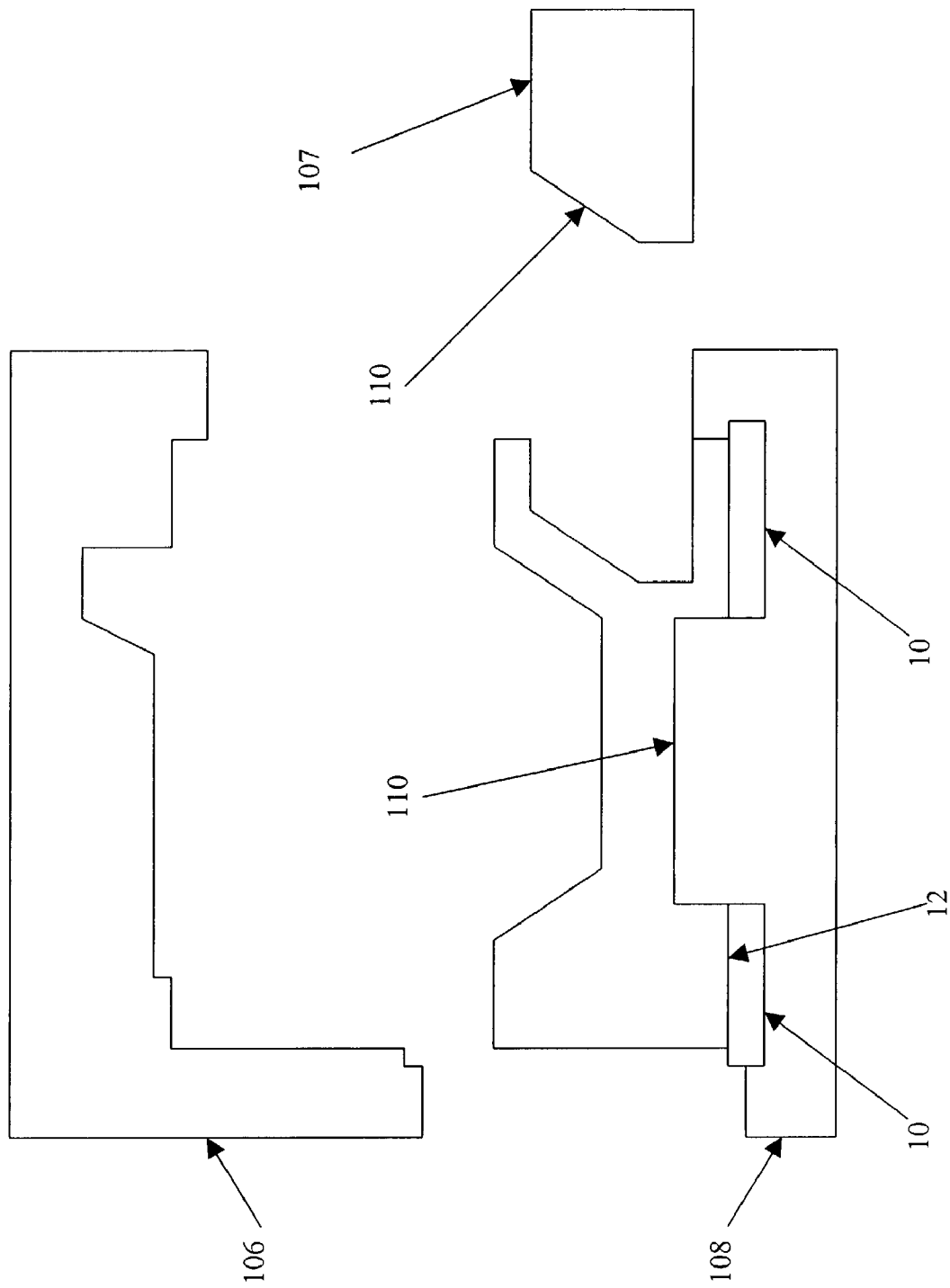
FIG. 7 is a schematic illustration of a step in an exemplary method of forming a seat in accordance with the principles of the claimed invention, showing a base and first foam portion in a mold.

In certain embodiments, it may be advantageous to produce two or more foam portions. In order to produce a seat 10 having a second foam portion 14, the combination of seat base 10 and first foam portion 12 produced in mold 102, 103, 104 may be disposed in a second mold 106, 107, 108, as shown in FIG. 7. The second mold parts 106, 107 and 108 are shown separated for clarity. As illustrated, the second mold 106, 107, 108 is a three-part mold, with an upper part 106, a center part 107, and a lower part 108. However, this is exemplary only, and other types of molds may be equally suitable.

As described above with regard to mold 102, 103, 104, the seat base 10 and first foam portion 12 occupies a portion of the mold 106, 107, 108, but leaves a portion of the mold 106, 107, 108 open.

Figure 8:
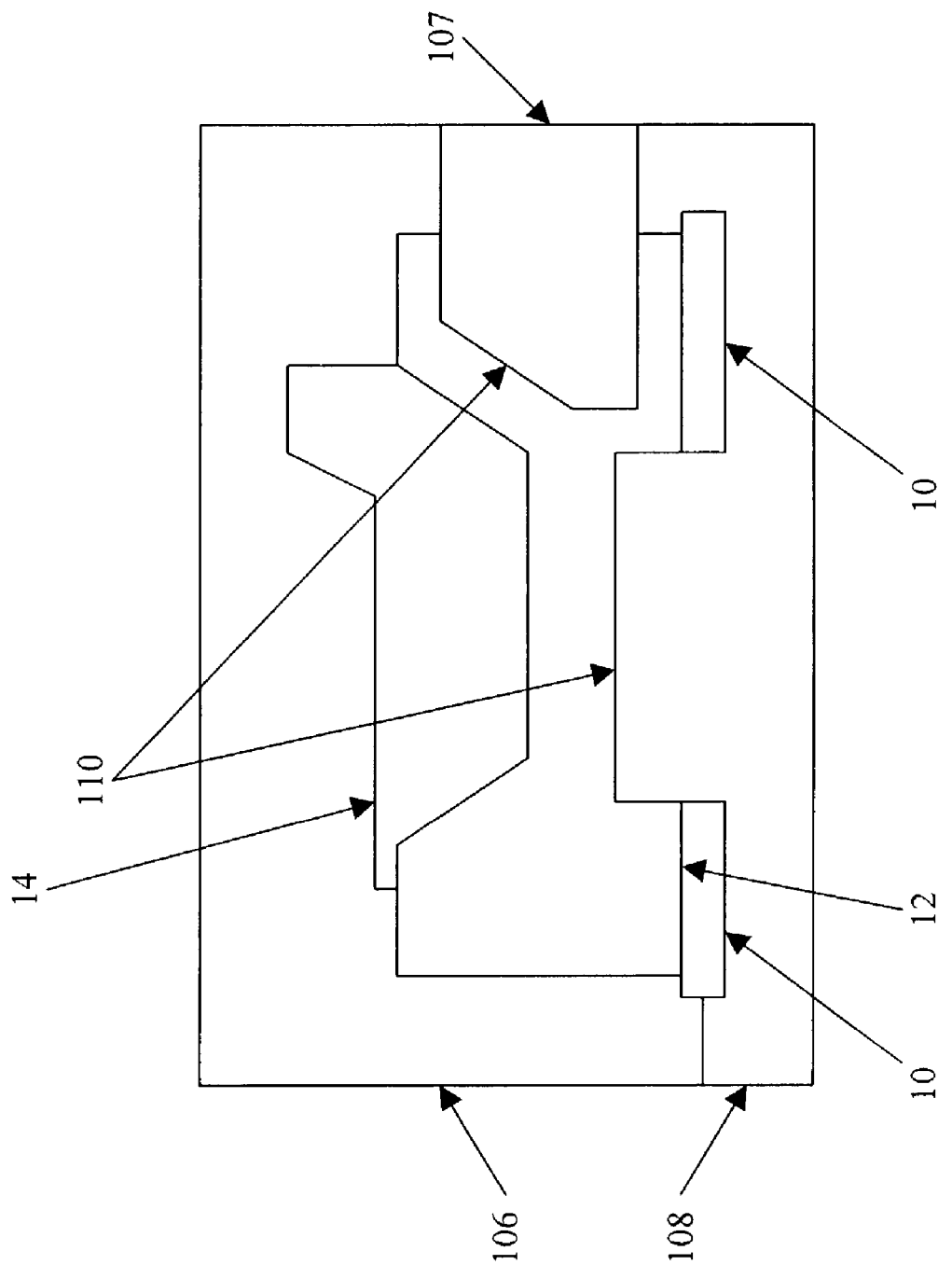
FIG. 8 is a schematic illustration of a step in an exemplary method of forming a seat in accordance with the principles of the claimed invention, showing another foam material introduced into the mold of FIG. 7.

A settable foam is introduced into the mold 106, 107, 108, so as to substantially fill the portion of the mold 106, 107, 108 that is not occupied by the seat base 10 and first foam portion 12. The resulting combination is shown in FIG. 8. When the settable foam sets, it bonds to the seat base 10 and first foam portion 12, forming a second foam portion 14 that conforms to the shape of the inner surface of the mold 106, 107, 108. The seat 1, comprising the base 10 and the first and second foam portions 12 and 14, is then removed from the mold 106, 107, 108.

Additional foam portions may be added as desired in a similar fashion.

Although as illustrated in FIGS. 5–8, the first and second foam portions 12 and 14 are both made by co-molding, this is exemplary only. In alternative embodiments, the first foam portion 12 might be made by co-molding, while the second foam portion 14 is made by other means, or vice versa.

Also, although as illustrated foam portion 14 is disposed only on foam portion 12, this is exemplary only. Any foam portion may be disposed on any combination of the seat base 10 and any previously applied foam portions.

As noted, the foam portions 12, 14 conform to the shape of the inner surface of their respective molds 102, 103, 104 and 106, 107, 108. Thus, a cavity 16 and/or a recess 28 may be produced in either or both foam portions 12, 14 by including projections 110 in the molds, as shown in FIGS. 5–8.

As illustrated, the projections 110 illustrated in FIGS. 5 and 6 cause a single cavity 16 and a single recess 28 to be formed in the first foam portion 12. The projections 110 illustrated in FIGS. 7 and 8 prevent the foam that is to make up the second foam portion 14 from filling in the cavity 16 and recess 28.

However, this arrangement is exemplary only. One or more cavities 16 and recesses 28 may be formed in either or both foam portions 12, 14, and/or in any other foam portions that may be present. Likewise, cavities 16 and/or recesses 28 may extend into or through the seat base 10 as well.

A variety of foam types may be suitable for use as the foam portions 12, 14. Suitable foam types include, but are not limited to, open cell foam, closed cell foam, rigid foam, and flexible foam. A wide range of foam compositions and densities likewise may be suitable for use as the foam portions 12, 14. In addition, in certain embodiments, different foam portions 12, 14, may be made of different types of foam, different compositions, and/or different densities.

Figure 9A:
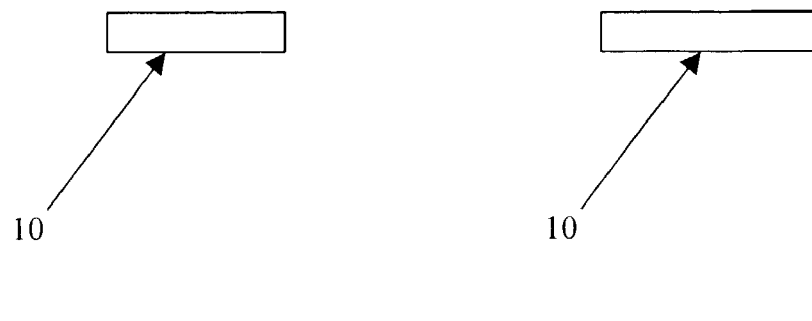
FIG. 9 shows a seat in accordance with the principles of the claimed invention in different stages of its production with a method in accordance with the principles of the claimed invention.
Figure 9B:
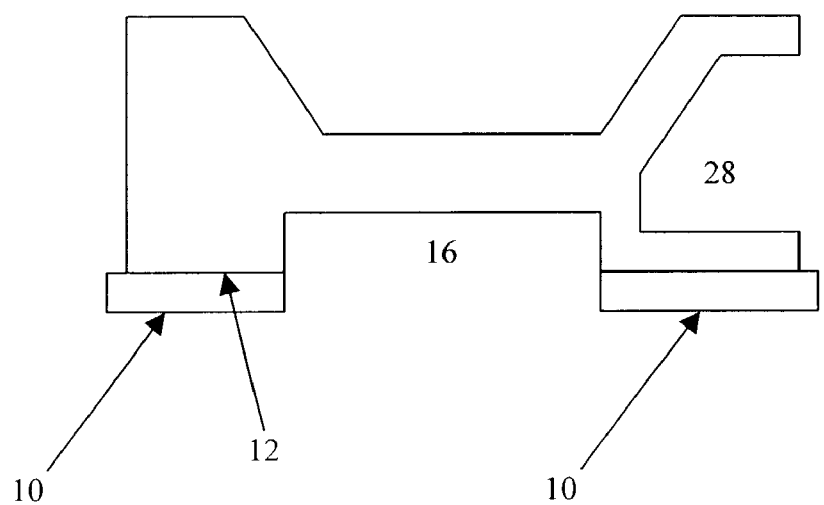
Figure 9C:
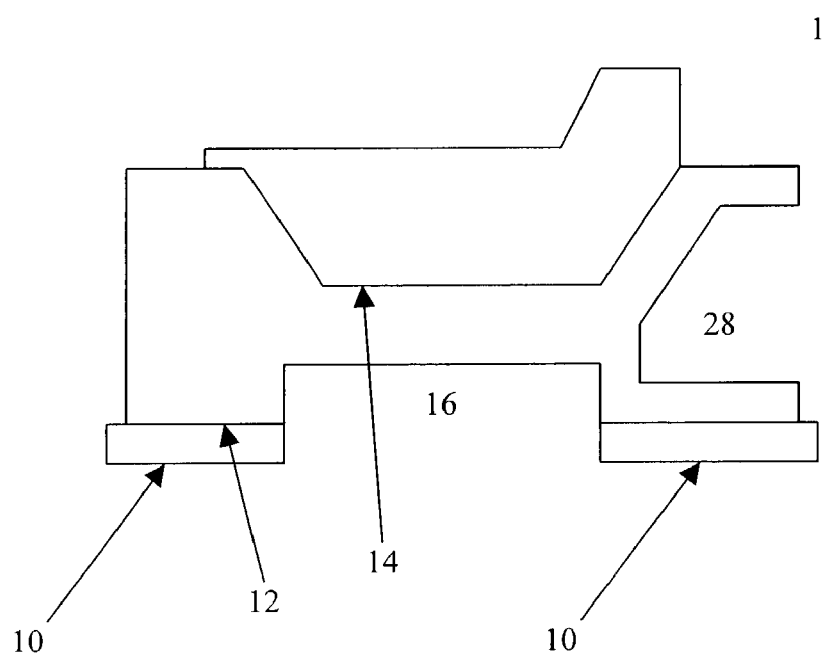

FIGS. 9A through 9C show an exemplary seat 1 with a seat base 10 and first and second foam portions 12 and 14 at several stages during its production in accordance with the principles of the claimed invention.

FIG. 9A shows the seat base 10 alone.

FIG. 9B shows the seat base 10 with the first foam portion 12 applied thereto. This combination is similar to a seat 1 removed from the mold 102, 103, 104 shown in FIGS. 5 and 6.

FIG. 9C shows the seat base 10 and first foam portion 12 with the second foam portion 14 applied thereto. This combination is similar to a seat 1 removed from the mold 106, 107, 108 shown in FIGS. 7 and 8.

It is noted that the Figures herein are presented in simple form for purposes of clarity. Embodiments of the claimed invention may be made that are much more complex in shape and structure.

In particular, it is emphasized that a method for making seats in accordance with the principles of the claimed invention, wherein one or more foam portions is co-molded to a seat base, is not limited to the simple exemplary seats illustrated herein, but rather may produce seats having essentially any shape, structure, and size.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A vehicle seat, comprising:
a generally rigid seat base, the seat base defining a first recess and a first substantially horizontally extending aperture;
a cushion disposed on the seat base at least partially vertically above the seat base, the cushion defining a second recess;
wherein the first and second recesses are aligned to define at least one cavity, the at least one cavity being adapted to removably accept cargo therein, the at least one cavity being accessible through the first substantially horizontally extending aperture defined by the vehicle seat.

2. The vehicle seat according to claim 1, wherein:
the vehicle seat further includes at least one recess accessible through a second substantially horizontally extending aperture defined by the vehicle seat.

3. The vehicle seat according to claim 2, wherein:
said at least one recess and said at least one cavity are in communication.

4. The vehicle seat according to claim 1, wherein:
the cavity is shaped to conform to a particular predetermined cargo selected from the list consisting of a shovel, a thermos, a shovel blade, and a shovel handle.

5. The vehicle seat according to claim 1, further comprising:
a cargo retention means for removably retaining cargo in the-at least one cavity.

6. The vehicle seat according to claim 1, wherein:
the cushion is co-molded to the seat base.

7. The vehicle seat according to claim 6, wherein:
said seat base comprises keys thereon for gripping said cushion.

8. The vehicle seat of claim 1, wherein the cushion comprises a cushion aperture substantially aligned with the substantially horizontally extending aperture.

9. The vehicle seat according to claim 1, wherein:
the vehicle seat comprises a retention means for releasably retaining the vehicle seat in engagement with a vehicle without tools.

10. A device, comprising:
a vehicle seat, the vehicle seat being adapted to be used on a snowmobile, the vehicle seat including
a generally rigid seat base, the seat base defining a first recess and a horizontally extending aperture; and
a cushion disposed on the seat base, the cushion defining a second recess;
wherein the first and second recesses are aligned to define at least one cavity, the at least one cavity being adapted to removably accept cargo therein, the at least one cavity being accessible through the first substantially horizontally extending aperture defined by the vehicle seat.

11. The device of claim 10, wherein:
the vehicle seat further includes at least one recess accessible-through a second substantially horizontally extending aperture defined by the vehicle seat.

12. The device of claim 10, wherein:
the cavity is shaped to conform to a particular predetermined cargo selected from the list consisting of a shovel, a thermos, a shovel blade, and a shovel handle.

13. The device of claim 10, wherein:
the cushion includes foam.

14. The device of claim 10, wherein:
the vehicle seat comprises a retention means for releasably retaining the vehicle seat in engagement with the snowmobile without tools.

15. The device according to claim 10, further comprising:
a cargo retention means for removably retaining cargo in the at least one cavity.

16. The device according to claim 10, wherein:
the cushion is co-molded to the seat base.

17. The device of claim 10, wherein the cushion comprises a cushion aperture substantially aligned with the substantially horizontally extending aperture.

18. A device, comprising:
a snowmobile; and
a seat, the seat being adapted to be used on the snowmobile, the seat including
a generally rigid seat base, the seat base defining a first recess and a substantially horizontally extending aperture; and
a cushion disposed on the seat base, the cushion defining a second recess;
wherein the first and second recesses are aligned to define at least one cavity, the at least one cavity being adapted to removably accept cargo therein, the at least one cavity being accessible through the substantially horizontally extending aperture.

19. The device of claim 18, wherein:
the seat further includes at least one recess accessible from a second substantially horizontally extending aperture defined by the seat.

20. The device of claim 18, wherein:
the cushion is co-molded to the seat base.

21. The device of claim 18, wherein:
the seat comprises a retention means for releasably retaining the seat in engagement with the snowmobile without tools.

22. The device of claim 18, wherein:
the cavity is shaped to conform to a particular predetermined cargo selected from the list consisting of a shovel, a thermos, a shovel blade, and a shovel handle.

23. The device of claim 18, wherein:
the cushion comprises foam.

24. The device of claim 18, further comprising:
a cargo retention means for removably retaining cargo in the at least one cavity.

25. The device of claim 18, wherein the snowmobile has a forward end and a rearward end and wherein the first substantially horizontally extending aperture is proximate the rearward end.

* * * * *

UNITED STATES PATENT AND TRADEMARK OFFICE
CERTIFICATE OF CORRECTION

PATENT NO. : 7,100,979 B2  Page 1 of 1
APPLICATION NO. : 10/283383
DATED : September 5, 2006
INVENTOR(S) : Andy Beavis and Ron Bergman It is certified that error appears in the above-identified patent and that said Letters Patent is hereby corrected as shown below:

On the title page and column 1, line 1:
Title should read, --FOAM PADDED SEAT WITH STORAGE SPACE--.

Signed and Sealed this

Fifth Day of December, 2006

JON W. DUDAS
*Director of the United States Patent and Trademark Office*